(12) United States Patent
Euler et al.

(10) Patent No.: US 7,407,108 B1
(45) Date of Patent: Aug. 5, 2008

(54) WEB CONTENT POWER CONSUMPTION NOTIFICATION FOR WIRELESS DEVICES

(75) Inventors: Timothy D. Euler, Leawood, KS (US); Jim F. Pearce, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 261 days.

(21) Appl. No.: 11/136,813

(22) Filed: May 24, 2005

(51) Int. Cl.
*G06K 7/10* (2006.01)
(52) U.S. Cl. .................. 235/472.01; 358/406; 455/574
(58) Field of Classification Search ............ 235/472.01; 358/406; 455/574
See application file for complete search history.

(56) References Cited

U.S. PATENT DOCUMENTS

| | | | | |
|---|---|---|---|---|
| 5,179,724 A | | 1/1993 | Lindoff | 455/76 |
| 5,224,152 A | | 6/1993 | Harte | 455/343 |
| 5,845,142 A | * | 12/1998 | Hayasaka | 713/340 |
| 6,067,171 A | * | 5/2000 | Yamada et al. | 358/406 |
| 6,480,700 B1 | | 11/2002 | Groe et al. | 455/69 |
| 6,532,375 B2 | | 3/2003 | Cathey et al. | 455/574 |
| 6,947,181 B1 | * | 9/2005 | Sato | 358/400 |
| 2002/0058537 A1 | * | 5/2002 | Bhatoolaul et al. | 455/572 |
| 2003/0229813 A1 | * | 12/2003 | Shiiyama | 713/300 |
| 2004/0002367 A1 | * | 1/2004 | Chanut | 455/574 |
| 2004/0102228 A1 | * | 5/2004 | Hakamata et al. | 455/572 |
| 2006/0264197 A1 | * | 11/2006 | Mahini et al. | 455/343.5 |

* cited by examiner

*Primary Examiner*—Daniel A Hess

(57) ABSTRACT

A network node in a communication path between a client station and a web content server determines or estimates a power consumption level associated with particular web content requested by the client station. The client station is preferably a wireless communications device operating on battery power. Based on the current battery level in the device, the battery type or total capacity, user preferences and determined or estimated power consumption level, the node sends a power consumption notification to the client station, either prior to or simultaneously with the transmission of the web content. The notification message alerts the user to the possibility of their battery being drawn down to a low level if they download the content, and thus allows the user to abort the download to preserve battery capacity.

5 Claims, 13 Drawing Sheets

1. Article #1
2. Article #2
3. Article #3
4. Article #4

FIG. 11

1. <A HREF="http://www.newsmagazine.com/article0001.htm">Article # 1</A><BR>
2. <A HREF="http://www.newsmagazine.com/article0002.htm">Article # 2</A><BR>
3. <A HREF="http://www.newsmagazine.com/article0003.htm">Article # 3</A><BR>
4. <A HREF="http://www.newsmagazine.com/article0004.htm">Article # 4</A><BR>

FIG. 12

| MARK-UP PATTERN | SIZE | TYPE | ACTION |
|---|---|---|---|
| <A HREF="http://www.newsmagazine.com/article0001.htm"> | 14;0 | .jpg; 0 | ADDPWRMSG(IDPWR (size,type)) |
| <A HREF="http://www.newsmagazine.com/article0002.htm"> | 8; 40,000 | .wav; .mpg | ADDPWRMSG(IDPWR (size,type)) |
| <A HREF="http://www.newsmagazine.com/article0003.htm"> | 20; 300,000 | .txt; .pdf | ADDPWRMSG(IDPWR (size,type)) |
| <A HREF="http://www.newsmagazine.com/article0004.htm"> | 16; 20,000 | .txt; .exe | ADDPWRMSG(IDPWR (size,type)) |

FIG. 13

1. <A HREF="http://www.newsmagazine.com/article0001.htm">Article #1</A> (OK Notification)<BR >
2. <A HREF="http://www.newsmagazine.com/article0002.htm">Article #2</A> (Notification 1)<BR>
3. <A HREF="http://www.newsmagazine.com/article0003.htm">Article #3</A> (Notification 2)<BR>
4. <A HREF="http://www.newsmagazine.com/article0004.htm">Article #4</A> (Notification 3)<BR>

FIG. 14

1. Article #1 (power consumption ok)
2. Article #2 (power consumption level: low)
3. Article #3 (power consumption level: medium; your battery will be low)
4. Article #4 (power consumption level: high; your battery may be below 5% if this content is downloaded)

FIG. 15

WEB CONTENT POWER CONSUMPTION NOTIFICATION FOR WIRELESS DEVICES

BACKGROUND

1. Field of the Invention

The present invention relates to network communications and more particularly to mechanisms for providing notification to wireless devices of power consumption levels associated with downloading of web content (e.g., web pages, objects, files, applications, etc.). The notification methods give the user of the wireless device the opportunity to decline to download the content if the battery level of the wireless device is low or will become low if it proceeds with the download. The invention also relates to a proxy computing platform, referred to herein as an "intermediation platform," in the communication path between the client station and the content server that provides power consumption ratings or notices to wireless devices.

2. Description of Related Art

In recent years, usage of the Internet and the World Wide Web have become ubiquitous. The sheer volume of information and services available at any time via the Internet is astounding, and continues to grow constantly. As such, users often turn to the Internet to communicate with others, to receive information, to shop, to be entertained, to meet people, and for assorted other reasons.

As its name implies, the Internet is a network of computer networks. The world wide web is, in turn, an application environment that runs on the Internet, powered by web servers and web browsers. A web server stores or has access to "web pages" made up of various objects (e.g., text, graphics, audio, video or other media and logic) and can send the pages to web browsers that access the server via hypertext transfer protocol (HTTP) or another agreed protocol.

A web page is usually defined by a set of markup language, such as hypertext markup language (HTML), wireless markup language (WML), handheld device markup language (HTML), extensible hypertext markup language (XHTML) or compact HTML (cHTML) for instance. The markup language typically specifies text to be displayed and includes tags that direct the browser to carry out various functions. For instance, a tag can direct the browser to display text in a particular manner. A tag can also direct the browser to request and load other objects, such as images or sound files, to be presented as part of the web page. Or as another example, a tag can direct the browser to display a hyperlink that points to another web page or object (or generally referencing any other web content).

(Note that markup language could take other forms as well. As one other example, for instance, a markup language such as voice extensible markup language (VXML) could include voice-tags that direct a browser to play out speech messages to a user. In that event, the client station might be a voice command platform with which a user communicates via a telephone link. Still other examples are also possible.) A user operating a web browser on a client station can direct the web browser to navigate to a particular web page or to load other web content. To do so, the user may select or enter into the browser a universal resource identifier (URI), typically a universal resource locator (URL), which points to a host web server, usually by a domain name, and identifies the requested content, usually by a path and filename. In response, the browser will then generate and send to the web server an HTTP "GET" request message, which indicates the URI. When the server receives the GET request, if the requested content is available, the server will then respond by sending to the browser an HTTP "200 OK" response message that includes the requested content. And when the browser receives the HTTP response, the browser will then present the content to the user.

As is well known, Internet communications occur through a defined set of protocol layers, including an application layer, a transport layer, a network layer and a physical layer. Applications, such as a web browser and a web server, communicate with each other according to an application layer protocol, such as HTTP. And those communications are then arranged as data packets, which are passed between the applications according to a transport layer protocol such as TCP and between network nodes according to the network layer IP protocol. Each packet typically bears a TCP/IP header, which indicates source and destination IP addresses as well as source and destination TCP ports associated with the respective applications.

In order for a web client to engage in HTTP communication with a web server, the client and server will first establish a TCP "socket" or "connection" between each other. The client then sends an HTTP GET request in the TCP socket, typically through one or more routers, switches and/or proxies, to the IP address of the server. The server responds by sending a 200 OK response in the TCP socket to the IP address of the client.

Alternatively, the web client may open up a first TCP socket with a designated proxy server, and the proxy may open up a second TCP socket with the web server. The web client may then send an HTTP GET request in the first TCP socket to the proxy, and the proxy may then send the HTTP GET request in the second TCP socket to the IP address of the web server. In turn, the web server may send a 200 OK response in the second TCP socket to the proxy, and the proxy may then send the 200 OK response in the first TCP socket to the IP address of the web client.

Wireless communications devices, such as personal digital assistances, pocket PC computers, and even cellular phones, now often include software which enable the devices to browse the Internet and download content. Such devices, being mobile in nature, are powered by a built-in, rechargeable battery. While battery power is unavoidably consumed in web browsing activity, some types of web pages require more battery consumption than others. In particular, downloading large multimedia content files, such as audio and video content, typically consumes much more battery power than say downloading of a text document or engaging in two way voice communication. As another example, playing interactive games with another player over the Internet typically consumes more battery power than viewing a web page with simple text and graphics.

In current practice, a wireless device may be conducting web browsing and engaging in downloading content or playing interactive games to the point where the battery level is so depleted that the operator has only a few minutes of life left in which to place a simple phone call, or may become depleted entirely. While most wireless devices have a battery icon to indicate remaining life, such icons are only measuring the current situation and do not offer the user any ability to gauge whether certain contemplated web-based actions will adversely affect battery life. There is a need in the art to provide a mechanism to notify wireless device users of the power level consumption that is to be expected based on the type or characteristics of the file they are attempting to download. There is a further need to alert the devices that a particular download activity may deplete their battery and to give them the opportunity to abort or avoid the download activity where their battery will be deleted (or have only a little life left) if they proceed. This invention meets that need.

SUMMARY

An exemplary embodiment of the present invention provides a mechanism for giving a user operating a client station powered by a battery advance notice of power consumption associated with web content requested by the device, based at least in part on the type and size of the web content. The mechanism may also provide power consumption ratings or notices based on the current battery level and battery type of the device. In the illustrated embodiments the device is a wireless communications device, such as cellular telephone, personal digital assistant, laptop computer with wireless modem, or other device that operates on battery power and yet can communicate over an air interface with a land-based network to request and receive web content.

The apparatus that provides this power consumption notification function is referred to in the following detailed description as an "intermediation platform". The realization of this platform can take a variety of forms, such as the form of a general purpose computing platform with appropriate network interfaces and processing instructions, as explained in the following description. The function of the intermediation platform can also be incorporated into an existing computing platform, e.g., server, router, etc. This platform preferably sits in the communication path between the wireless device and the content server, and may, for example, be implemented in a node in the radio access network connecting the device to a packet switched network or in a network node (e.g., server) in a wireless service provider enterprise network. It may further function as a proxy for the content server, in which it receives content requests from the wireless devices, forwards the content request to the content server, receives the content from the server, and then forwards the content to the wireless device.

In one respect, the exemplary embodiment may take the form of a method that involves, during transmission of web content within a communication path between a content server and a client station, adding into the web content power consumption information into the referenced content. That way, the power consumption information will be presented to a user when the web content is presented to the user, thereby giving the user notice of the power consumption to be expected with the web content. For example, the power consumption information by take the form or a level or rating, e.g., "high power consumption" indicating that the content will consume a relatively high amount of power, as in the case of audio+video+content, as in an interactive gaming application. Alternatively, the notice may take the form of a "lower power consumption" rating, if the content is merely text. By providing these types of notices to the user of the wireless device, they may exercise the option to abort or stop the downloading of the content if their existing battery capacity is going to be overly consumed by the content.

In preferred embodiments the power consumption notification is tied to the current battery level in the wireless device. The device preferably forwards current battery level and battery information to the intermediation platform. The battery information could include the type of battery. The battery information could also be inferred from information as the identification of the device itself (e.g., the make and model, serial number, etc.). With this information, it is possible to configure the system, such as by defining a user profile, such that the intermediation platform may only provide power consumption information where the battery level will be diminished to a threshold level if the content is downloaded to the device. This way, routine web browsing and downloading of web content in the form of text will not trigger providing power consumption information when the battery is fully charged; only when the device's battery level is sufficiently low and the power consumption level of the content is sufficiently high (e.g., will be estimated to bring the battery below say 10% capacity) will a power consumption rating be provided.

The power consumption ratings identified with particular web content can be determined or estimated based on several factors, either alone or in combination, such as the size of the content (in terms of bytes), the type of media, and whether the file type is one in which further processing beyond mere presentation of the file on the user interface of the wireless device is anticipated, e.g., in the case of files which involve subsequent user activity, e.g., in the case of games. The power consumption rating or level will also typically take into consideration both the current battery level and the battery capacity, so that a given content may trigger a warning with a battery with limited capacity and low level, but with a battery with a large capacity or one that is fully charged a different notification (or no notification at all) may be sent. This determination of power consumption rating can be done on the fly, as the content is accessed, or it could be previously determined. The determination can be made by execution of a mathematical algorithm based on such factors as file size, file type, expected processing power per byte per file type, etc., or it can be simply an estimate or educated guess, based on these or other factors.

In yet another respect, the exemplary embodiment may take the form of an intermediation platform or system located within a web communication path between a client station and a content server (such as within an access channel). The intermediation system may include a network interface for receiving and sending communications on the web communication path, and the network interface may receive a communication that carries web content including a hyperlink that points to referenced web content. The intermediation system may then further include power consumption logic for (i) determining or identifying a power consumption rating associated with the referenced web content, and (ii) inserting into the web content an indication of power consumption rating. In turn, the network interface may send the power consumption rating along the web communication path for ultimate receipt and presentation of the power consumption rating by a browser running on the client station. For example, the web content may be defined by a set of markup language (HTML or XML code for example). The adding of the power consumption level message may simply involve adding into the set of markup language, adjacent to the hyperlink, display text indicative of the power consumption notification message.

These as well as other aspects and advantages will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which:

FIG. 11 is an exemplary illustration of hyperlinks that may be set forth in a web page displayed at a client station.

FIG. 12 is a source code listing, depicting markup language that may underlie the hyperlinks shown in FIG. 11.

FIG. 13 is a partial illustration of a markup-pattern table, depicting records that an exemplary intermediation system may reference in order to trigger addition of power consumption notification information to web content.

FIG. 14 is a source code listing, depicting the markup language of FIG. 12, modified to produce an indication of power consumption notification next to each hyperlink;

FIG. 15 is an exemplary illustration of hyperlinks embellished with power consumption notifications pursuant to the exemplary embodiment.

DETAILED DESCRIPTION OF PREFERRED EMBODIMENTS

As a general matter, an exemplary embodiment of the present invention provides an intermediation platform and related methods for network communications, and more particularly for web communications. The intermediation platform provides power consumption ratings and notices to wireless devices with respect to web content the devices access or attempt to access. The intermediation platform preferably sits within a web communication path between a client station and a content server, so that it can detect and act on web communications that pass between the client and the server.

Before describing a representative intermediation platform and associated methods in further detail, an overview of a network architecture for providing web content to client stations will be described initially in order to provide further context for the present invention.

1. Exemplary Base Network Architecture and Method of Operation

A web communication path between a client station and a content server can take various forms. Generally speaking, it is the path along which a request for web content passes from the client station to the content server and along which a response to the request passes from the content server to the client station. (Alternatively, separate web communication paths could exist for the request and response.)

The web communication path can be an HTTP (HyperText Transfer Protocol) communication path, and the web communications could be HTTP messages. However, the path and communications could take other forms as well, complying with any desired protocol. For purposes of example only, this description will refer to HTTP communication paths and HTTP communications.

In practice, a request for web content could be carried by a single HTTP request message that is sent from the client station to the content server. Alternatively, the request for web content could be carried in multiple HTTP request messages, such as one that is sent from the client station to an intermediate point (e.g. proxy, portal, etc., which may function as an intermediation platform) and another that is then sent from the intermediate point to the content server, for instance. Similarly, the requested web content could then be carried in an HTTP response message that is sent from the content server to the client station. In still another alternative, the content could be carried in multiple HTTP response messages, such as one that is sent from the content server to an intermediate point and another that is then sent from the intermediate point to the client station, for instance. Additional steps could exist as well.

Figure 1:
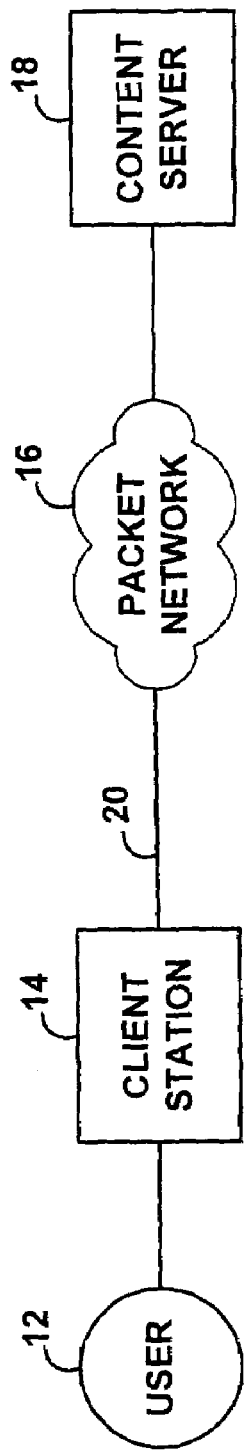
FIG. 1 is a block diagram showing an exemplary web communication path between a client station and content server.

Referring to the drawings, FIG. 1 depicts an exemplary HTTP communication path between a client station 14 (in this example a wireless communications device such as cellular telephone, personal digital assistant, hand-held computer or other device) and a content server 18. It should be understood, however, that this and other arrangements described herein are set forth for purposes of example only. As such, those skilled in the art will appreciate that other arrangements and other elements (e.g., machines, interfaces, functions, orders of functions, etc.) can be used instead, and some elements may be omitted altogether. Further, as in most telecommunications applications, those skilled in the art will appreciate that many of the elements described herein are functional entities that may be implemented as discrete or distributed components or in conjunction with other components, and in any suitable combination and location.

Still further, various functions described herein as being performed by one or more entities may be carried out by hardware, firmware and/or software logic. For instance, various functions may be carried out by a processor executing a set of machine language instructions stored in memory. Provided with the present disclosure, those skilled in the art can readily prepare appropriate computer instructions to perform such functions.

As shown in FIG. 1, client station 14 and content server 18 are linked together by a packet-switched network (or generally "data network") 16, which may take the form of the Internet. More particularly, client station 14 communicates on an access channel 20, which provides the client station with connectivity to the packet-switched network 16. (I.e., the client station is communicatively linked via the access channel to the packet-switched network.) The access channel 20 may include, for example a conventional radio access network infrastructure including base transceiver station, base station controller, mobile switching center, and other entities, such as found in a CDMA cellular telephone network offered by a wireless network provider such as Sprint, Verizon, or other provider. The content server 18 sits on the packet-switched network 16 or is otherwise accessible via the packet-switched network. (I.e., the content server is communicatively linked with the packet-switched network.) Thus, HTTP communications between client station 14 and content server 18 pass over a communication path that includes access channel 20 and packet-switched network 16. Note that the access channel itself can comprise one or more links, whether circuit-switched and/or packet-switched.

In this general arrangement, a browser running on client station 14 may generate an HTTP GET request, seeking web content from content server 18. The client station may then open a TCP socket with content server 18 and send the GET request through access channel 20 and packet-switched network 16 to the IP address of content server 18. Upon receipt of the request, the content server 16 may then generate an HTTP 200 OK response that carries markup language defining the requested content. The content server may send the 200 OK response through packet-switched network 16 and access channel 20 to the IP address of the client station 14. Ultimately upon receipt of the response, the client station 14 may then present the content to a user 12.

The type or nature of the web content served from content server 18 is not important and could consist of interactive gaming applications, image files (still or video), audio, text, application files, any combination of the above, or other type.

Figure 2:
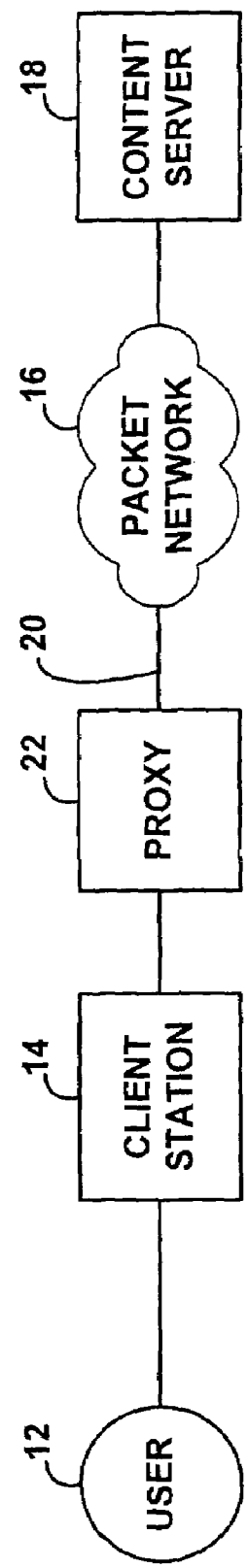
FIG. 2 is a block diagram showing an exemplary web communication path that includes a proxy.

Referring next to FIG. 2, a variation on the arrangement of FIG. 1 is shown. In FIG. 2, a proxy server 22 is added within the HTTP communication path between the client station 14 and the content server 18. In the figure, the proxy sever 22 is located within the access channel 20 between the client station 14 and the packet-switched network 16. However, the proxy server 22 could instead reside elsewhere in the HTTP communication path, such as elsewhere on packet-switched network 16 for instance. Further, multiple proxy servers could be provided.

In the arrangement of FIG. 2, a request for web content still passes along the HTTP communication path from the client station 14 to the content server 18. However, in this arrangement, separate TCP sockets may exist between the client station 14 and proxy server 22 on one hand and the proxy server 22 and content server 18 on the other hand. Thus, the communication path carries a request for web content in an HTTP GET request from the client station 14 to the proxy server 22 and then in another HTTP GET request from the proxy server 22 to the content server 18. The communication path carries the requested web content in an HTTP 200 OK response from the content server 18 to the proxy server 22 and then in another HTTP 200 OK response from the proxy server to the client station.

Alternatively, proxy server 22 may be a transparent proxy, which does not itself establish TCP sockets with the two endpoints but instead just forwards HTTP messages to their destinations. Thus, for instance, if the client station 14 opens a TCP socket with the content server 18, the client station 14 may send an HTTP GET request to the content server 18, via the proxy server 22. The content server 18 may send an HTTP 200 OK response to the client station 14, via the proxy server 22.

Figure 3:
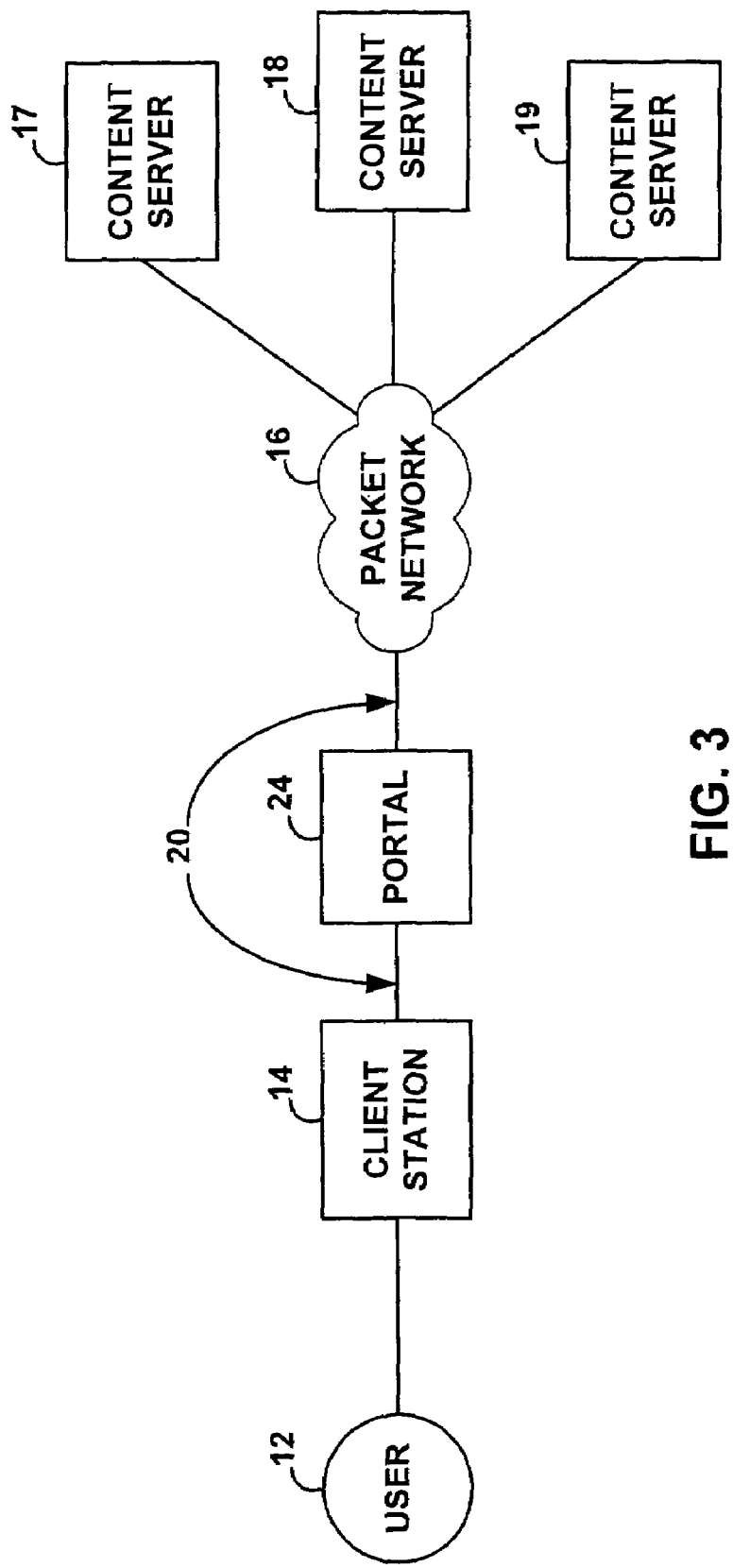
FIG. 3 is a block diagram showing an exemplary web communication path that includes a web portal.

Referring next to FIG. 3, another variation on the arrangement of FIG. 1 is shown. In FIG. 3, a web portal 24 has been added within the HTTP communication path between the client station 14 and the content server 18. Like proxy server 22 in FIG. 2, this portal 24 is shown in the access channel 20 between the client station 14 and the packet-switched network 16. However, the portal 24 could reside elsewhere in the HTTP communication path.

As is well known, a web portal is effectively a web server itself, although it may get its web content from one or more content servers, typically aggregating or visually integrating the content together in respective frames or other "portlets" (e.g., as components of a single web page). For this reason, FIG. 3 illustrates multiple content servers 17, 18, 19 on packet-switched network 16.

In the arrangement of FIG. 3, a request for web content again still passes along the HTTP communication path between the client station 14 and content server 18. However, in usual practice, the request passes as an HTTP GET request from the client station to an IP address of the web portal 24, rather than to an IP address of the content server 18. Upon receipt of the request, the portal 24 may then establish a TCP socket respectively with each of the content servers 17, 18, 19 (or at least with one of them) and send to each content server an HTTP GET request seeking web content for a particular portlet. Each of the content severs 17, 18, 19 may then send a 200 OK response message to the portal 24, providing a respective subset of web content. The portal 24 may then aggregate the subsets of web content together to form a single set of web content. The portal may then send a 200 OK response to the client station 14, providing the aggregated web content, i.e., the content from each of the underlying content servers 17, 18, 19.

Alternatively, it is possible that portal 24 may have already received and cached (stored) certain web content that the portal will use in various portlets. In that event (assuming the content has not expired), the portal 24 would not need to request the content from a content server in response to a GET request from the client station 14. But the effect is as though the portal does so, since the portal provides the client station with web content from a content server, in response to a GET request from the client station.

With the inclusion of a portal, an HTTP communication path may still be said to extend between the client station 14 and the content serer 18, since a request for web content (by or on behalf of the client station 14) is sent to the content server 18, and web content is then transmitted from the content server 18 for ultimate receipt and presentation by the client station 14, albeit through the portal.

It should be understood that the arrangements shown in FIGS. 1-3 are representative of many possible communication systems, including many possible HTTP communication paths between a client station and a content server. In this invention, the client station 14 is a wireless communications device that operates on battery power and the access channel 20 is a wireless communication radio access network, such as for example a conventional CDMA cellular telephone network. As one example, the client station could be a wireless terminal such as a 3G mobile station, for example a cellular telephone, personal digital assistant, pocket PC, Blackberry™ device or other type of wireless communications device.

Figure 4:
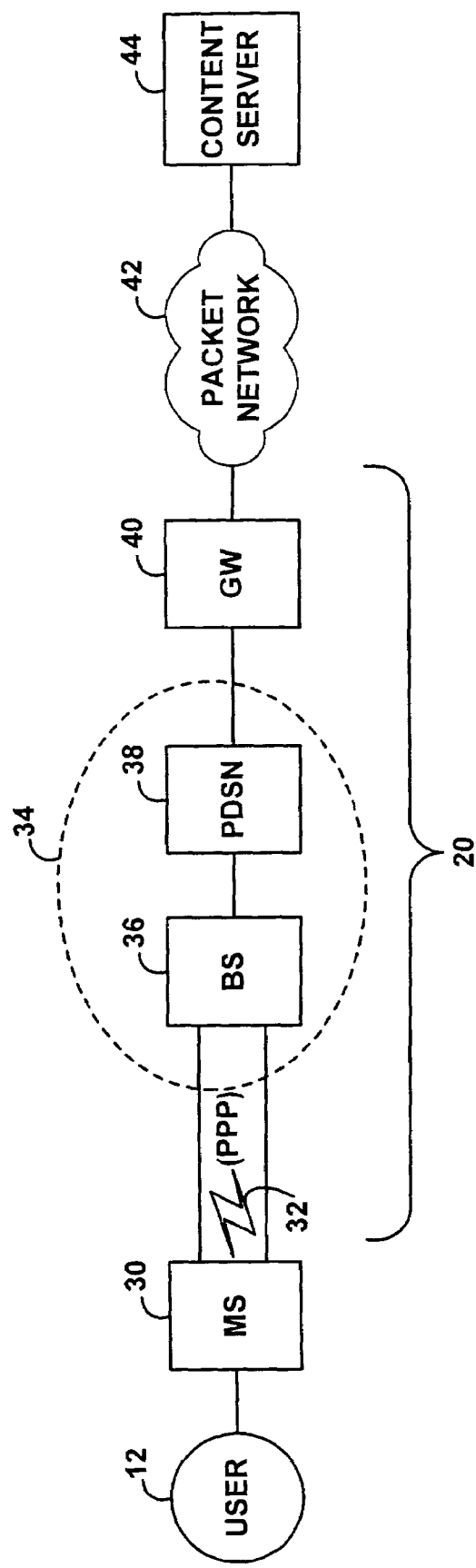
FIG. 4 is a block diagram showing an exemplary web communication in a wireless communication system.

Referring to FIG. 4, an example wireless communication system is shown. In this example, the client station is a 3G mobile station 30, which communicates over an air interface 32 with a radio access network 34. (The radio access network 34 is shown to include a base station 36, which controls air interface communications with the mobile station, and a packet data serving node (PDSN) 38, which provides packet-switched network connectivity. However, the radio access network could take other forms instead.) Radio access network 34 is then coupled via a gateway 40 to a packet-switched network 42. A web content server 44 sits on the packet-switched network.

In this arrangement, the access channel 20 between the client station 14 and the packet-switched network 42 includes the air interface 32, the radio access network 34, and the gateway 40. In this regard, the air interface might carry wireless communications in compliance with any radio communication protocol, such as CDMA, TDMA, GSM/GPRS, EDGE, UMTS, 802.11 (e.g., 802.11a/b), or Bluetooth, for instance. This description will consider CDMA by way of example.

According to existing 3G CDMA protocols, the mobile station 30 and PDSN 38 can establish a point-to-point protocol (PPP) data link, over which packet data can pass between the mobile station 30 and the packet-switched network 42. Further, the mobile station may have an assigned IP address and may communicate through a mobile-IP home agent (not shown), to facilitate mobility.

An exemplary 3G mobile station may be a handheld device such as a cellular or PCS telephone or personal digital assistant (e.g., Palm or Pocket-PC type device) for instance. As such, the mobile station will likely have a relatively small display screen. Additionally, because the display screen will likely be too small to display full size HTML pages, the mobile station will likely be equipped with a "microbrowser," which is a web browser tailored to present web content on a smaller handset display. An exemplary microbrowser is the Openwave™ Mobile Browser available from Openwave Systems Inc., which can be arranged to provide mobile information access through compliance with the industry standard Wireless Application Protocol (WAP) as well as various markup languages such as HDML, WML, XHTML, and cHTML.

If the mobile station 30 is a handheld device running a microbrowser, gateway 40 might function as a WAP gateway, to transcode web content being sent from content server 44 to mobile station 30, so as to put the web content and HTTP signaling into a form suitable for reference by the microbrowser (if not already). Alternatively, gateway 40 could function merely as a proxy, particularly where web content being sent to the mobile station is already in a form suitable for interpretation and presentation by the microbrowser.

Additionally, gateway 40 can function to inject into an HTTP request from mobile station 30 a user ID that can be used by downstream entities (such as content server 44, for instance) to provide user-specific functionality. In this regard, gateway 40 could maintain or otherwise have access to information that correlates user ID to session ID, so that the gateway can determine what user ID to insert for an HTTP communication from a given mobile station 30 (user 12).

Alternatively, the mobile station 30 could be a more full scale computing platform, such as a desktop or notebook personal computer, equipped with a wireless communication interface to facilitate communication over air interface 32 and through radio access network 34. (For instance, the personal computer could be linked (wirelessly or through a pin-out port or other connection) to a 3G handheld device, or the personal computer could include a plug-in card (e.g., PCI card or PCMCIA such as the AirCard® available from Sierra Wireless, Inc.) that provides for wireless communication.) In that event, the mobile station might have a more full scale web browser such as Microsoft Internet Explorer® or Netscape Navigator® for instance, which can conventionally receive and interpret HTML web content.

In the arrangement shown in FIG. 4, an HTTP communication path exists between mobile station 30 and content server 44. Thus, mobile station 30 may send an HTTP request (or equivalent request) for web content to content server 44, and content server 44 may respond by sending the requested web content to the mobile station 30. Mobile station 30 may then present the content to a user 12.

In an alternative arrangement, note that gateway 40 could sit on a core packet network (not shown) that resides between the radio access network 34 and the packet network 42. The core packet network could be a private IP network operated by the wireless carrier. The packet network 42 may then be a public packet network such as the Internet. (Alternatively, the networks could take other forms.) Further, it is also possible that content server 44 might reside on the core packet network rather than on the public packet network 42.

Figure 5:
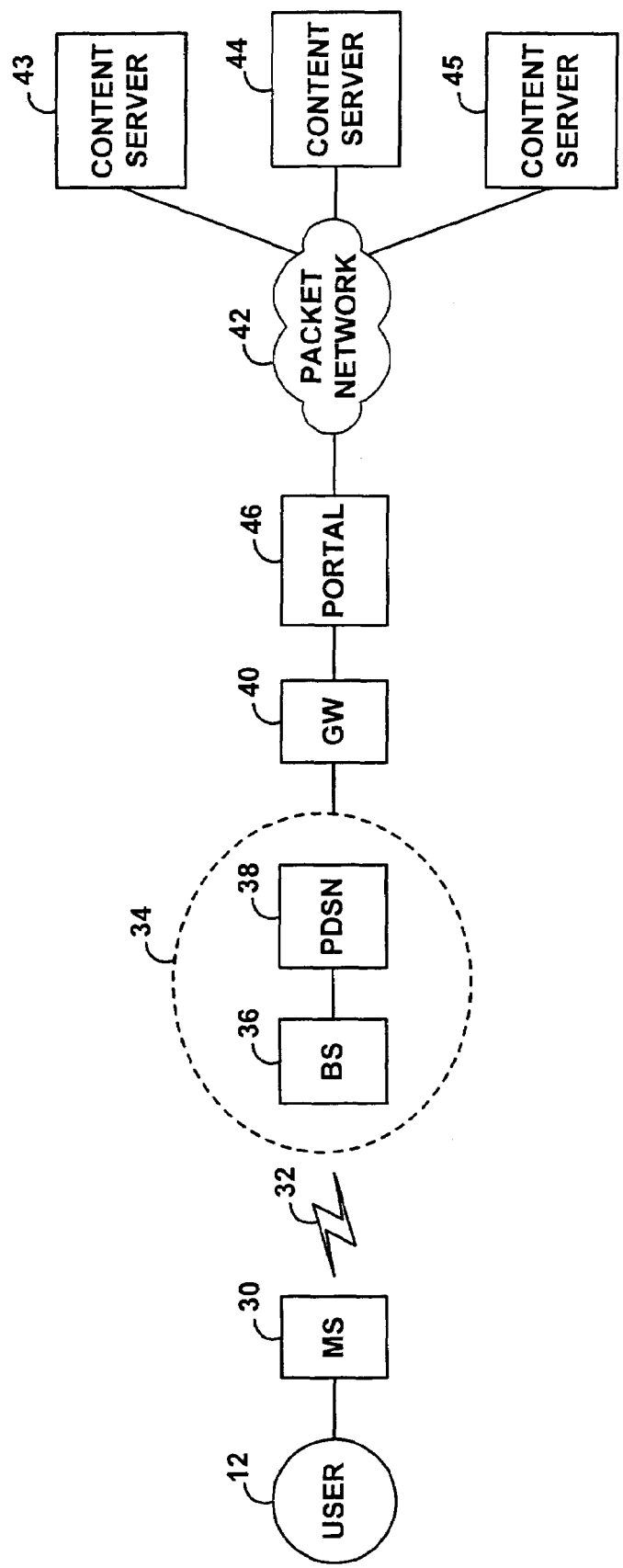
FIG. 5 is a block diagram showing an exemplary web communication path in a wireless communication system, including a portal within an access channel.

Referring next to FIG. 5, a variation on the arrangement of FIG. 4 is now shown. Similar to FIG. 3, this Figure introduces a web portal in the access channel between the client station (mobile station 30) and the packet-switched network. Additionally, this figure shows several content servers 43, 44, 45 on the packet-switched network 42. Thus, similarly, an HTTP communication path still exists between the mobile station 30 and content server 44. However, the mobile station may send a request for web content to the portal 46, instead of to a content server. The portal may then aggregate content from the one or more content servers 43, 44, 45, and provide the aggregated content to the mobile station in an HTTP response.

In this arrangement, the web portal 46 functions as described above, to aggregate web content in various portlet containers of a single web page. In this regard, if the mobile station 30 is a handheld device with a small display screen, it is possible that only one (or part of one) portlet will appear on the display screen of the mobile station at a time. (According to the HDML markup protocol, for instance, the portlets might be provided as separate "cards" (akin to pages), and a group of cards could be sent to the mobile station as a deck. Other arrangements are also possible.) In that case, a user of the mobile station may have to navigate from portlet to portlet. Alternatively, the user may be able to view the entire portal page at once, possibly by scrolling horizontally and vertically through the page.

As noted above, an exemplary embodiment of the present invention provides a mechanism for giving a user operating a client station 14 powered by a battery notice of power consumption associated with web content requested by the device, based at least in part on the type and size of the web content. The mechanism may also provide power consumption ratings or notices based on the current battery level and battery type of the device. In the illustrated embodiments the device 14 is a wireless communications device, such as cellular telephone, personal digital assistant, laptop computer with wireless modem, or other device that operates on battery power and yet can communicate over an air interface with a land-based network to request and receive web content.

The apparatus that provides this power consumption notification function is referred to in the following detailed description as an "intermediation platform". The realization of this platform can take a variety of forms, such as the form of a general purpose computing platform with appropriate network interfaces and processing instructions, as explained in the following description. The function of the intermediation platform can also be incorporated into an existing computing platform, e.g., server, router, etc. This platform preferably sits in the communication path between the wireless device and the content server, and may, for example, be implemented in a node in the radio access network connecting the device to a packet switched network or in a network node (e.g., server) in a wireless service provider enterprise network. It may further function as a proxy for the content server, in which it receives content requests from the wireless devices, forwards the content request to the content server, receives the content from the server, and then forwards the content to the wireless device. For example, the intermediation platform could be incorporated into the server 22 of FIGS. 1, 2; the web portal 24 of FIG. 3, or the gateway 40 of FIG. 4.

Figure 6A:
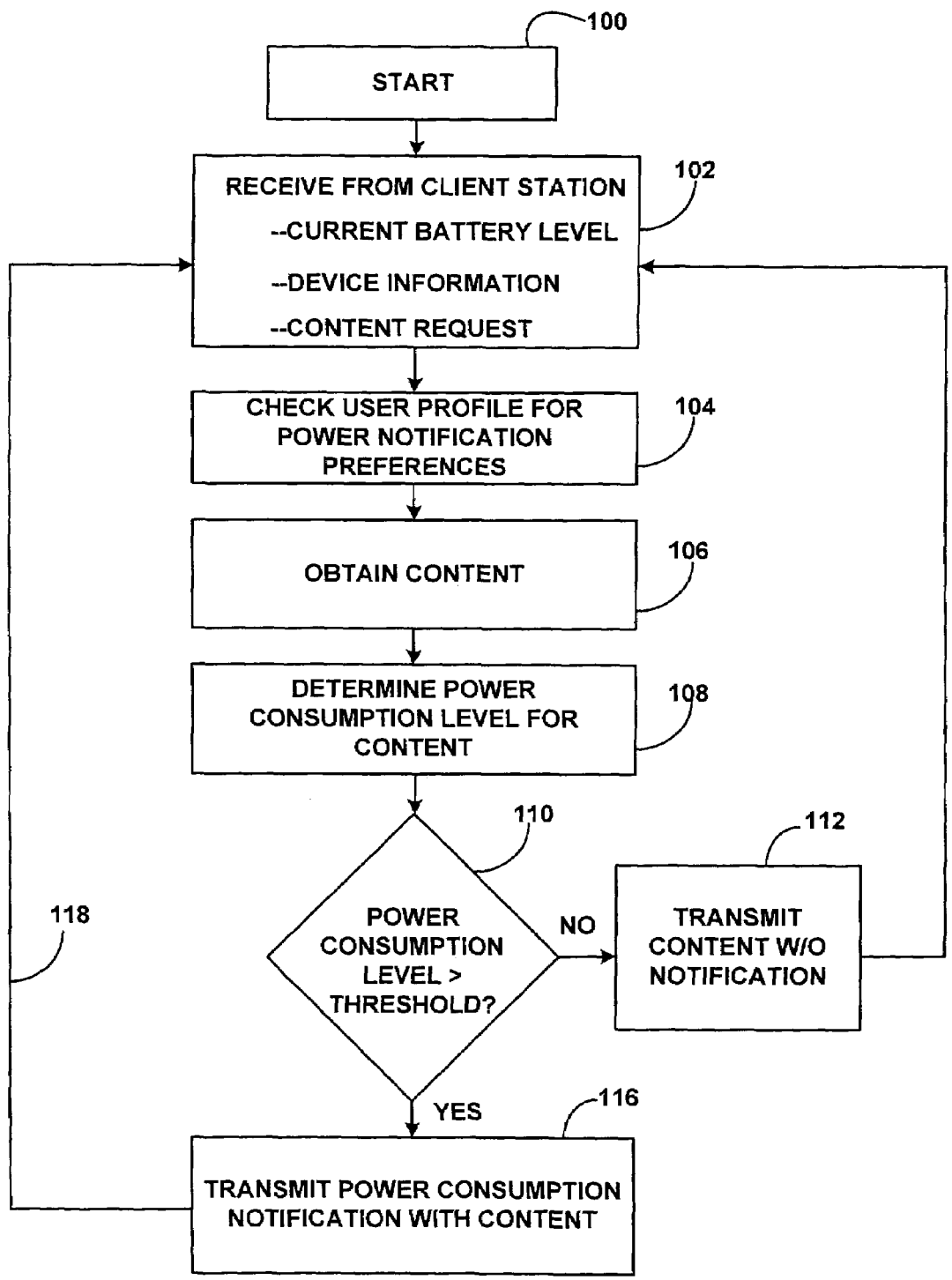
FIG. 6A is a flow chart showing a sequence of processing steps that are performed by an intermediation platform system in accordance with one possible embodiment, wherein a notification of power consumption is provided to a wireless device forming a client station of FIGS. 1-5.
Figure 6B:
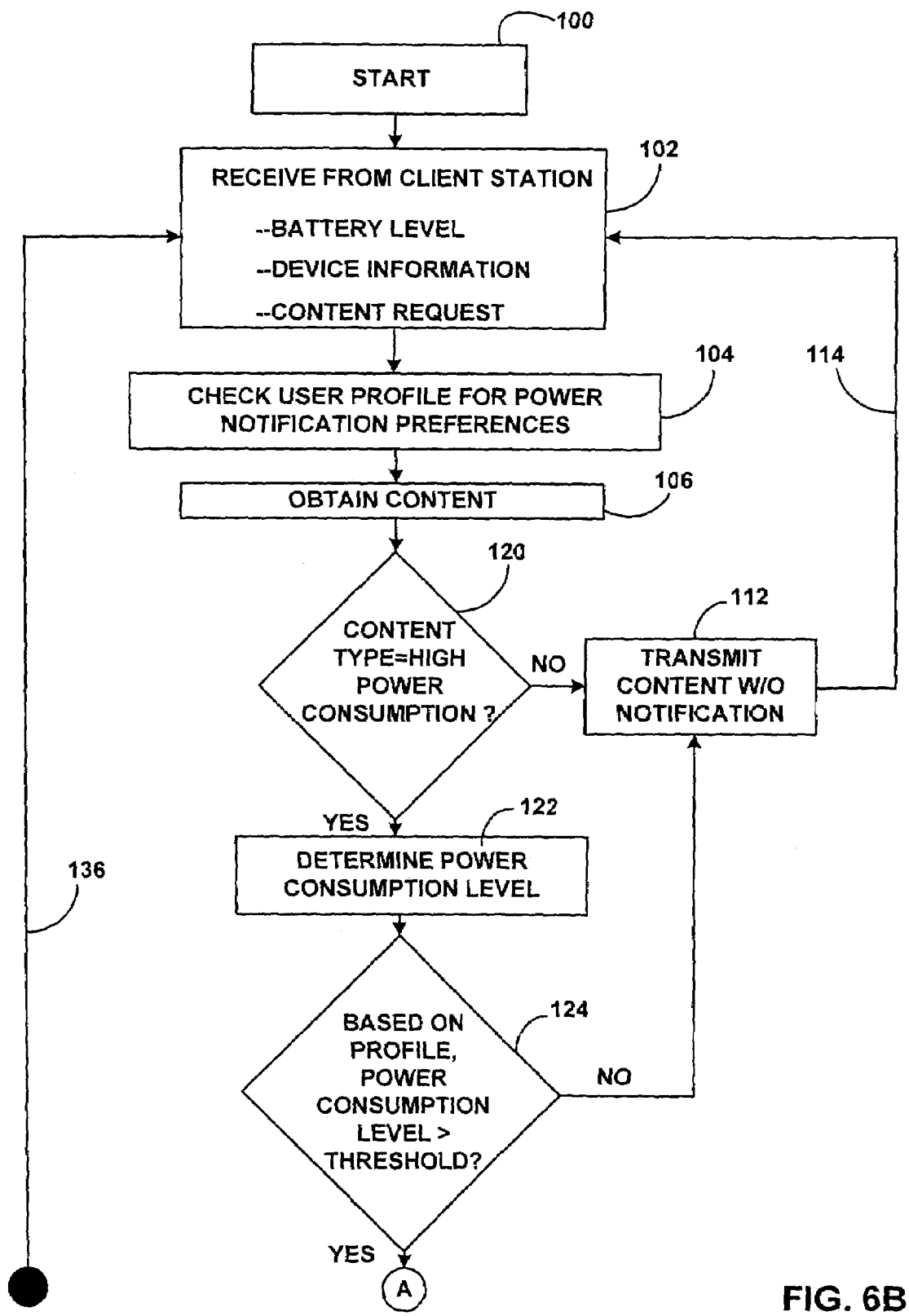
FIGS. 6B-6C are a flow chart for another alternative sequence of processing instructions to that of FIG. 6A.

Two representative methods for providing notice as shown in FIGS. 6A and 6B. Referring now to FIG. 6A, at the start of the process 100 a communication path between the client station 14 and the intermediation platform is established. This may involve opening a PPP session and establishing a TCP/IP session for communications between the intermediation platform and the wireless device. The wireless device has launched a web browser and begins to surf the web, initiating HTTP GET requests.

At step 102, the intermediation platform receives from the client station information as to a) the current battery level of the device, b) device information, such as the make and model of the device or the battery, or information from which this information could be obtained, such as device ID number, etc., and 3) a web content request. The battery level and device information data could be included in fields in an HTTP GET request, or could be in response to a specific query from the intermediation platform, or could be provided in additional packets sent from the device to the intermediation platform without prompting.

At step 104, the platform checks a user profile database for power notification preferences of the device. As explained in further detail below, the user may be able to establish preferences and priorities with their service provider that govern the situations when the user wants to be given power consumption notifications. These preferences are stored in a user profile database on the wireless server provider enterprise network. The preferences are retrieved by the intermediation platform in order to provide notifications that are consistent with the user preferences.

At step 106, the intermediation platform forwards the GET request from the client station to the content server and inserts its own IP address in the source IP address field. Accordingly, the content server returns the content to the intermediation platform.

At step 108, the intermediation platform calls a routine that determines power consumption level for the content, based on such factors as the size and type of content file, the battery level of the client station, the battery capacity, and user preferences.

At step 110, the intermediation platform checks to see if the power consumption associated with the content is greater than a threshold, either in terms of absolute power consumption or in terms of remaining battery life. If no, the processing proceeds to step 112 and the content is sent to the client station without any notification. (This assumes that the client station has a profile that it does not want to be notified if there is no risk of low battery level, or if the system is configured with such functionality being a default situation).

If at step 110 the power consumption level is greater than a threshold, the processing proceeds to step 116 wherein a power consumption notification is inserted into the content and the content+notification is sent to the client station. When the content is accessed by the client station, the display of the power consumption notification alerts the user that they may wish to abort the downloading of the content or access it later after their battery has been recharged. Had such notice not been provided, they may have downloaded the content but left with insufficient battery power to do other things, such as make a phone call with their device.

After the notice is given at step 116, the processing reverts back to step 102 and the process repeats for additional content requests. As noted in step 102, the battery level data is provided continually so that the processing in step 108 and 110 can reflect real time information for the device.

Figure 6C:
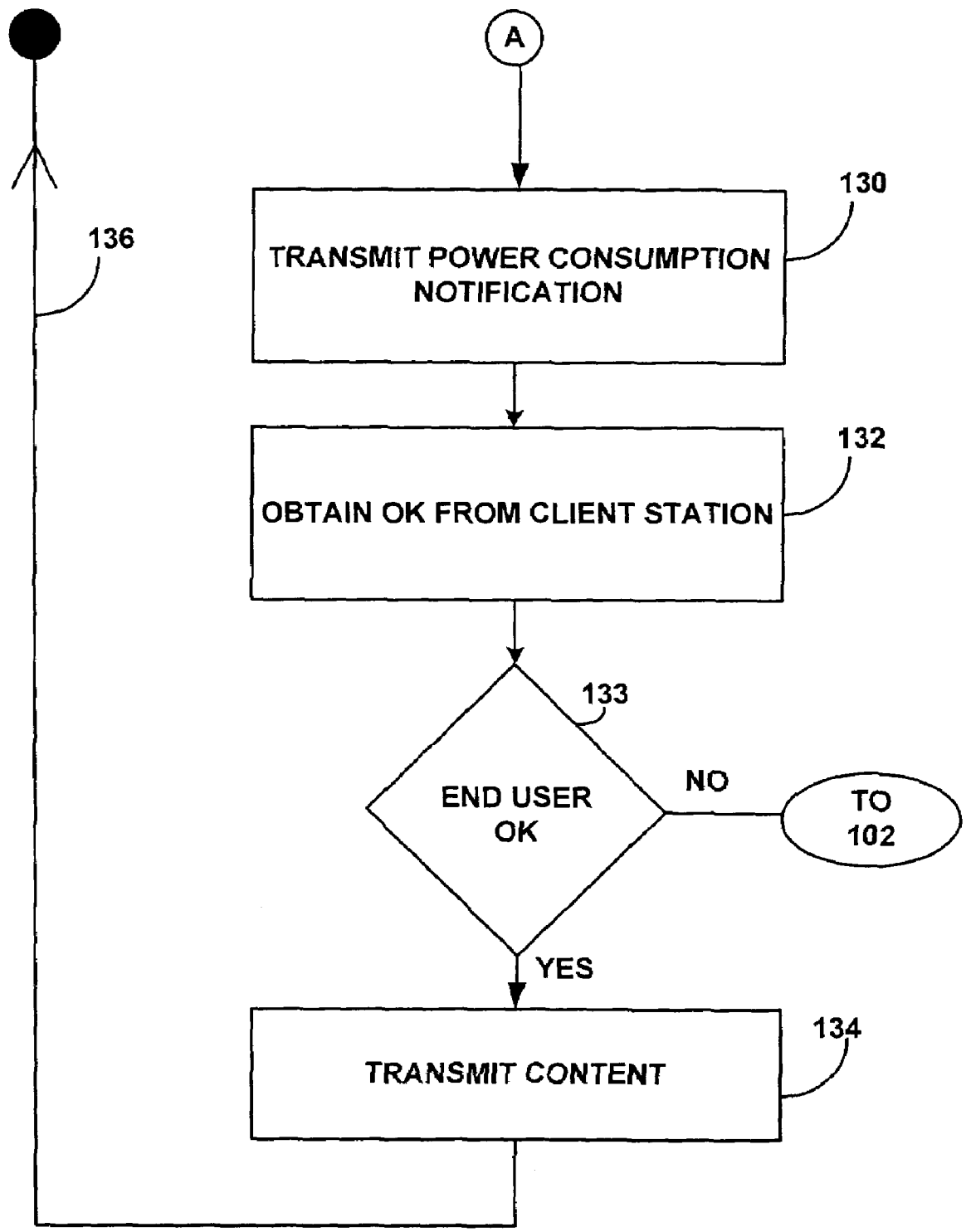

A variation on the process of FIG. 6A is shown in FIGS. 6B-6C. A primary difference between this embodiment and that of FIG. 6A is that in the embodiment of FIGS. 6B-6C, communication between the content server and the device occurs, prior to transmission of the web content.

Steps 100, 102, 104 and 106 are the same in FIG. 6B as in FIG. 6A. At step 120, a check is made to see if the type of content is one in which is associated with high power consumption, such as image or video files or interactive gaming files. A text file (e.g., a web page with just text) would be an example of a file type that is not a high power consumption type of content. Another example could be a web page with test and graphics. If the answer to the question at step 120 is no, the processing proceeds to step 112 and the content is delivered without any notice. Processing reverts back to step 102. the purpose of step 120 and 112 is to streamline the processing and allow the user to surf the Net without interruption with power consumption notices, or where no power consumption notice is desired.

If the power consumption check at step 120 is high, then at step 122 the process determines the power consumption level of the content (based on file size and type, battery level, battery capacity, preferences, etc.) and processing proceeds to step 124. At this step, based on the profile, a determination is made of whether the consumption is greater than a threshold. If no, then the content is transmitted without a notice. If so, then a power consumption notice is transmitted as indicated at step 130. Note that at this step the content itself has been cached at step 106 and is not yet sent. At step 132, interstitial communication between the platform and the device occurs wherein the device indicates its consent to have the content downloaded. If the OK is given, at step 134 the content is then sent to the client station. Processing then reverts back to step 102. as indicated by the arrow 118.

2. Exemplary Intermediation Platform System

As noted above, an exemplary intermediation system will sit within the HTTP communication path between a client station and content server. In this regard, the intermediation system will preferably include trigger logic, which detects HTTP communications, and power consumption determination logic, which acts on or in response to HTTP communications. In the exemplary embodiment, the intermediation system will be considered to sit within the HTTP communication path, as long as at least its trigger logic sits within the HTTP communication path. Some or all of the power consumption determination logic could then also lie within the HTTP communication path or could lie elsewhere and can be invoked as appropriate to carry out the power consumption notification functions.

Figure 7:
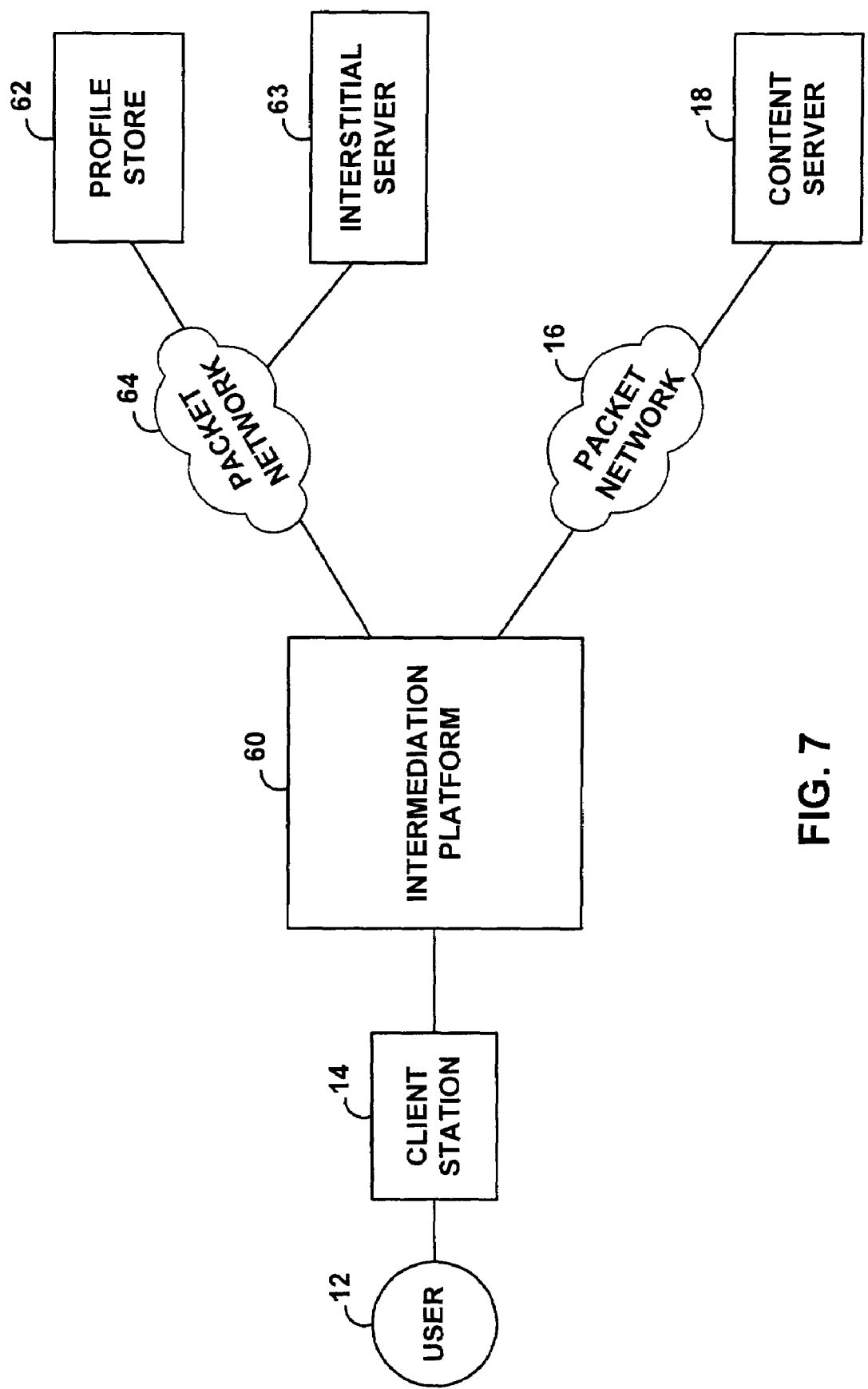
FIG. 7 is a block diagram showing placement of an intermediation system within web communication path, in accordance with the exemplary embodiment.

Referring now to FIG. 7, a variation of FIG. 1 is shown, to help illustrate the arrangement of an exemplary intermediation system. In FIG. 7, as in FIG. 1, a client station 14 communicates with a content server 18 over a packet-switched network 16, so that an HTTP communication path exists between the client station 14 and the content server 18.

As further shown, an intermediation platform 60 has then been inserted within that HTTP communication path. In particular, the intermediation platform 60 has been inserted within the access channel 20 between the client station 14 and the packet-switched network 16. As a result, HTTP communications (e.g., requests for web content, and responses providing web content) will necessarily pass through the intermediation platform 60 on their way between the client station 14 and the content server 18. With this arrangement, the owner or operator of the access channel 20 can advantageously intermediate in HTTP communications to and from users of the access channel and provide for example power consumption notices as the content is being accessed.

Alternatively, however, the intermediation platform could reside elsewhere in the HTTP communication path. If not in the access channel 20, a mechanism will preferably be provided to direct HTTP communications through the intermediation platform. For instance, the client station could be set to direct all HTTP requests to the intermediation platform as a proxy server.

In accordance with the exemplary embodiment, the intermediation platform 60 embodies intermediation trigger logic, so as to detect HTTP communications flowing between the client station 14 and the content server 18. In addition, the intermediation platform 60 may also include some or all of the intermediation power consumption determination logic. However, in an alternative embodiment, the intermediation platform 60 preferably includes only some of the power consumption determination logic, and the logic may also reside on one or more central servers or in the content servers.

In the arrangement of FIG. 7, the one or more central servers are shown as "interstitial" servers 63, labeled as such because the servers can be employed in the middle of an intermediation process, i.e., during an HTTP communication. By way of example, the interstitial servers 63 are shown linked with intermediation platform 60 by at least a packet-switched network 64. Packet-switched network 64 may or may not be the same network as packet-switched network 16. Thus, it is possible that interstitial servers 63 might sit on the same network where content server 18 sits. In the exemplary embodiment, however, packet-switched network 64 is preferably a private or core packet-switched network operated by the carrier that supplies client station 14 with access to packet-switched network 16, i.e., the owner or operator of access channel 20.

Generally speaking, the interstitial servers 63 may carry out various intermediation enforcement functions, possibly through interaction with user 12 of client station 14. By way of example, an interstitial server might function to collect user payment for requested web content. And as another example, an interstitial server might function to obtain user approval for release of confidential user information, such as user location or user passwords for instance. Other examples are possible as well.

A profile server 62 in shown. This server 62 may take the form of a database server accessing a database storing user profile information for a plurality of wireless service subscribers. The information for the subscribers will include various subscriber information, including but not limited to preferences on notification of power consumption levels for accessed web content.

Figure 8:
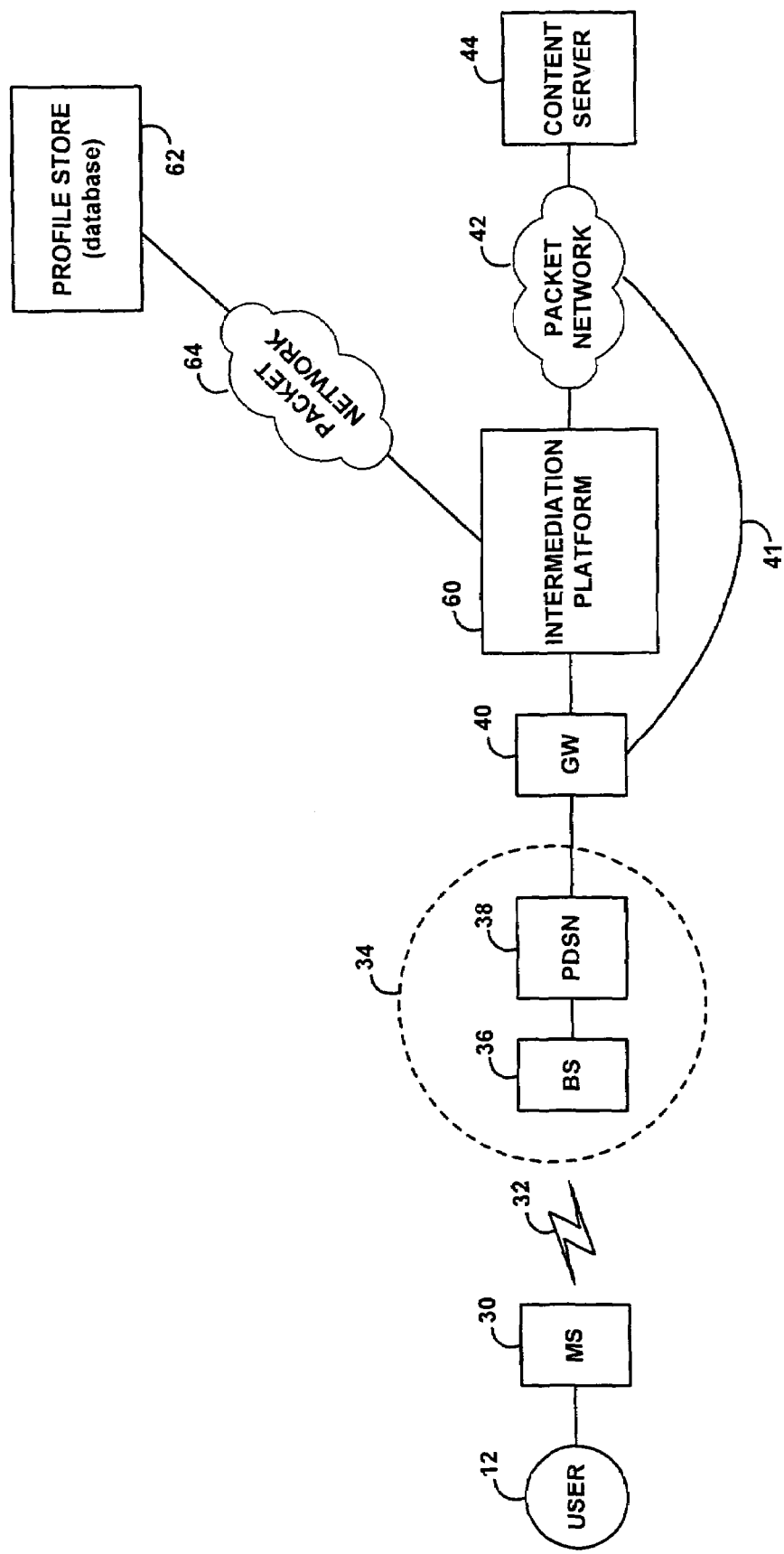
FIG. 8 is a block diagram showing placement of an intermediation system within a web communication path through a wireless communication system, in accordance with the exemplary embodiment.
Figure 9:
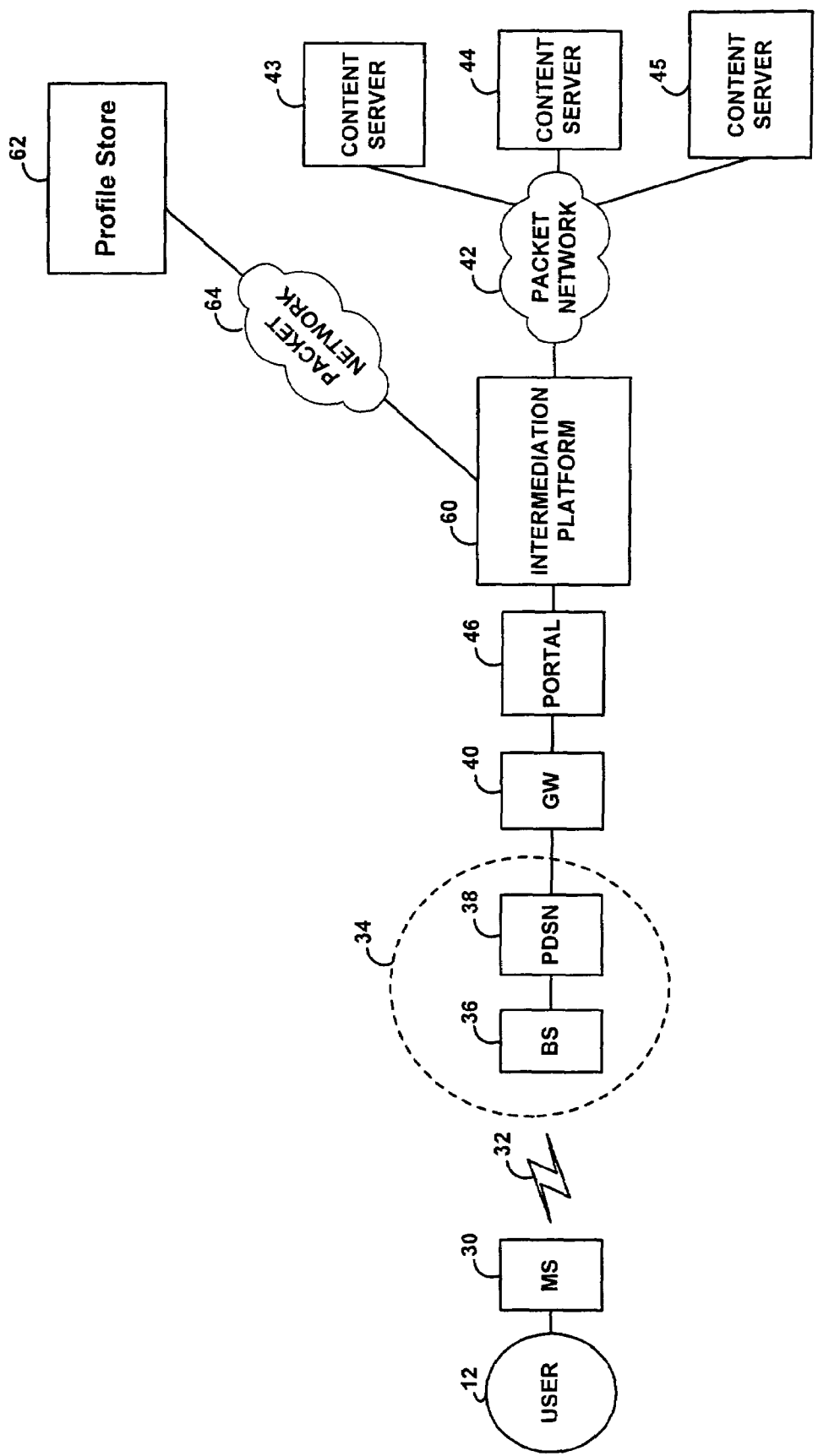
FIG. 9 is a block diagram showing placement of an intermediation system within a web communication path through a wireless communication system, including a web portal within the web communication path, in accordance with the exemplary embodiment.

The arrangement shown in FIG. 7 is generally representative of how an intermediation system can be inserted within an HTTP communication path between a client station and a content server. Referring next to FIGS. 8 and 9, some more specific arrangements are shown, in this case to illustrate one or many ways that the intermediation system could be implemented within a wireless communication system such as those shown in FIGS. 4 and 5 for instance. Similar arrangements could also be established in other systems, whether landline or wireless.

FIG. 8 is a variation on the more specific arrangement of FIG. 4. In FIG. 8, as in FIG. 4, the client station is a mobile station 30 that communicates over an air interface 32 and a radio access network 34, the content server 44 sits on a packet-switched network 42, and a gateway 40 sits between the radio access network 34 and the packet-switched network 42.

In FIG. 8, the intermediation platform 60 has then been inserted between the gateway 40 and the packet-switched network 42, so that the intermediation platform 60 sits within the HTTP communication path between the mobile station 30 and the content server 44. (Note that gateway 40 may also have a more direct connection 41 to the packet-switched network 42.) Additionally, the intermediation platform 60 is then shown linked with a core packet network 64, which may be owned and operated by the wireless carrier. Profile stores 62 are shown as nodes on the core packet network 64.

As one of many example variations from this arrangement, note that gateway 40 and intermediation platform 60 could themselves sit on core packet network 64. In that arrangement, the radio access network (and particularly PDSN 38) could be arranged to route outgoing traffic to gateway 40, and gateway 40 could in turn be arranged to route the traffic to the intermediation platform 60. The intermediation platform can then be arranged to route the traffic along its way, and/or to invoke or carry out an intermediation function. Similarly, incoming traffic can flow from the packet-switched network 42 to the intermediation platform 60, to the gateway 40 and to the radio access network, for transmission to the mobile station 30. Thus, with this variation, the intermediation platform would still sit within the HTTP communication path between the mobile station 30 and the content server 44.

Further, note that some of the functions of intermediation platform 60 and gateway 40 could be combined together on a common platform or could be allocated to the platform 60 and gateway 40 in various ways. For instance, the intermediation platform could perform some functions that would otherwise be performed by the gateway. Also, the gateway could perform some functions that would otherwise be performed by the intermediation platform.

(Still further, note that under normal circumstances, gateway 40 might cache premium web content to facilitate quicker delivery of the content to client stations such as mobile station 30. In the exemplary embodiment, the gateway would be arranged to not do so, unless the gateway functions as the intermediation platform. (Otherwise, HTTP requests for such content would normally not pass to the intermediation platform). For instance, when the intermediation platform 60 passes web content via gateway 40 to the client station, the intermediation platform could instruct the gateway to not cache the content.)

FIG. 9, in turn, is a variation on the arrangement shown in FIG. 5. In FIG. 9, as in FIG. 5, a web portal 46 has been added between the gateway 40 and the packet-switched network 42 on which the content server 44 sits. In FIG. 9, the intermediation platform 60 has then been inserted between the portal 46 and the packet-switched network 42, so the intermediation platform 60 sits within the HTTP communication path between the mobile station 30 and the content server 44. (That is, a request for web content, passed from the mobile station 30 to the portal 46 and from the portal 46 to the content server 44, will pass through the intermediation platform 60 on its way from the portal 46 to the content server 44. And requested web content provided by the content server 44 will pass through the intermediation platform 60 on its way from the content server 44 to the portal 46, for delivery of the content in turn to the mobile station 30.)

Additionally, the intermediation platform 60 is then shown linked with a core packet network 64, which may be owned and operated by the wireless carrier. Profile store 62 sits as a node on the core packet network 64.

As with FIG. 8, one of many possible variations in the arrangement of FIG. 9 is that the gateway 40 and portal 46 could instead sit on core packet network 64. Additionally, the intermediation platform 60 could also sit on core packet network 64. HTTP communications could flow through the core packet network and, particularly, through the intermediation platform 60, on their way between the mobile station 30 and the content servers 43, 44, 45.

It should be understood that numerous other arrangements and variations are possible as well. For example, referring to FIGS. 8 and 9, the intermediation platform 60 could instead be inserted in front of the portal 46 (to the left of the portal in the figure). And as another example, the intermediation platform 60 could be integrated as part of the gateway 40 or as part of the portal 46. And as still another example, the intermediation platform 60 could be inserted elsewhere within the HTTP communication path between the client station and content server, such as elsewhere on one or more packet-switched networks between the endpoints, for instance. (For instance, the intermediation platform could reside in an access channel to the content server, so as to maintain control over HTTP communications with that content server.) Further, multiple intermediation platforms 60 could be provided in a single HTTP communication path. For instance, one intermediation platform 60 could be provided for intermediating HTTP requests, and a separate intermediation platform 60 could be provided for intermediating HTTP responses. Still other variations are possible as well.

Figure 10:
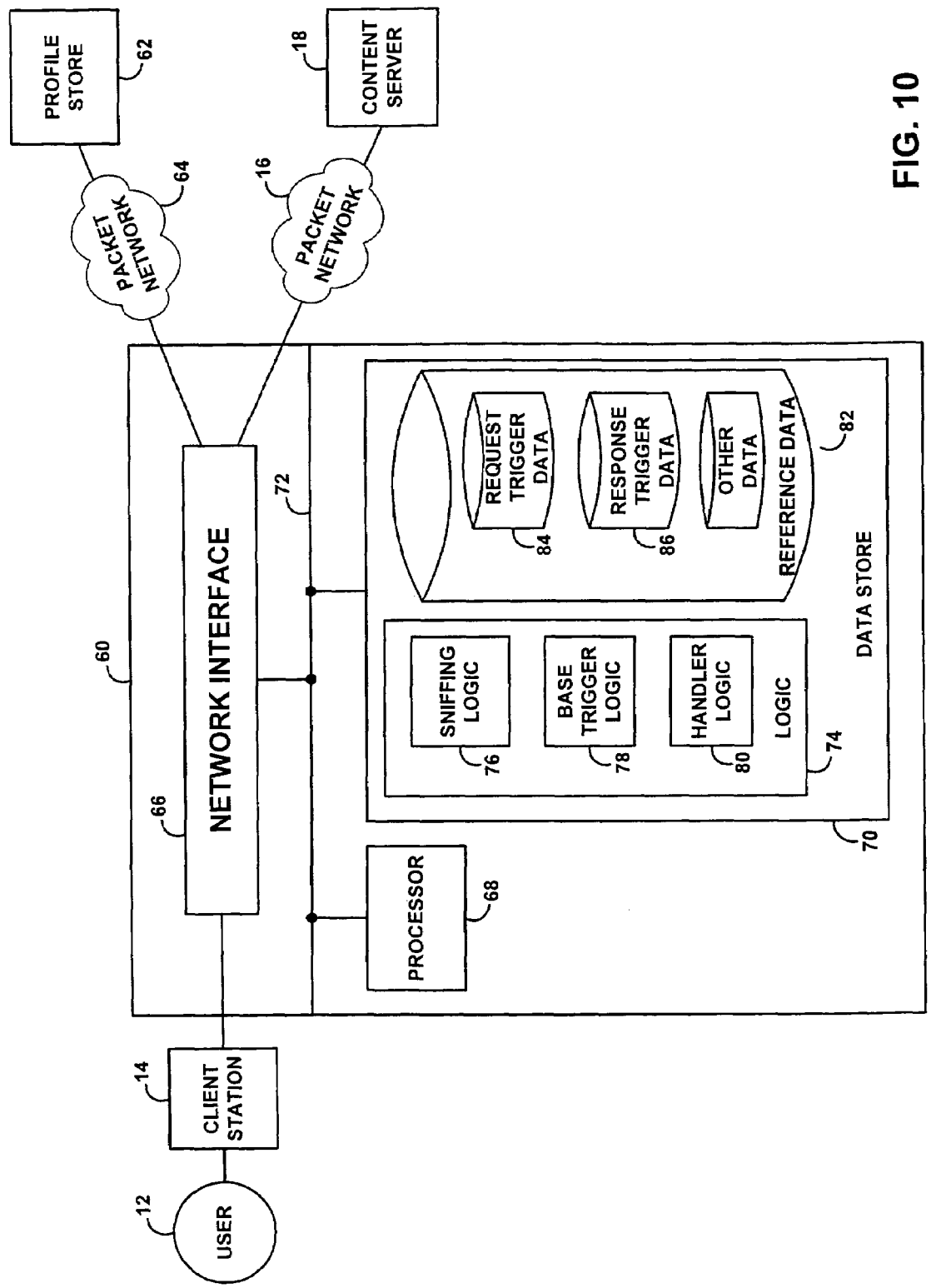
FIG. 10 is a block diagram of an exemplary intermediation platform.

Referring now to FIG. 10, a functional block diagram of an exemplary intermediation platform 60 is shown. The figure depicts the intermediation platform 60 in the context of the arrangement shown in FIG. 7 and uses the same reference numerals as used in that figure. Thus, the platform 60 sits in the HTTP communication path between a client station 14 and a content server 18, and the platform further has access to an interstitial server 62.

As illustrated in FIG. 10, the exemplary intermediation platform 60 includes a network interface 66, a processor 68, and data storage 70, all of which may be linked together by a system bus, a hub, a network, or some other mechanism 72. Generally speaking, the network interface 66 receives and sends IP packets that carry HTTP communications. And the processor 68 executes logic stored in data storage 70 in order to facilitate intermediation in response to those HTTP communications.

In the exemplary embodiment, data storage 70 preferably includes a set program logic 74 (e.g., machine language instructions), which the processor 68 can execute in order carry out various functions described herein. As shown in FIG. 10, the program logic 74 may include (i) detection or "sniffing" logic 76, (ii) base trigger logic 78 and (iii) handler logic modules 80, each of which could be loaded onto the platform or modified as desired, in order to provide a desired set of functionality.

The sniffing logic 76 is executable by the processor 68 to detect and extract HTTP messages (or, more generally, web communications) received by network interface 66. Thus, as IP packets enter network interface 66, the processor may apply sniffing logic 76 to determine whether the packets carry an HTTP message (as indicated by the port number (e.g., port 80) set forth in the packet headers, for instance). If so, the processor temporarily pauses transmission of the IP packet(s) that carry the HTTP message (i.e., temporarily pauses the HTTP communication), and the processor extracts the HTTP message and passes it in a function call to the base trigger logic 78.

The base trigger logic 78, in turn, is executable by the processor 68 to determine whether intermediation action (e.g., power consumption notification) should be taken in response to the HTTP message and, if so, to call one or more of the handler logic modules 80. The handler logic modules 80 are then executable by the processor to perform various intermediation functions, such as calling out to an profile store 62 and/or modifying HTTP messages by insertion of power consumption level notification messages.

In addition, data storage 70 preferably includes a set of local reference data 82, which the processor 68 can reference when executing logic 74, so as to facilitate various intermediation functions. In the exemplary embodiment, the reference data 82 may include tables of data (or other forms of data) that indicate what, if any, action(s) to take in response to particular HTTP messages. For example, the reference data 82 may correlate particular HTTP messages (by URI pattern, for instance) with one or more of the handler logic modules 80.

Base trigger logic 78 may thus refer to the reference data 82 in order to determine whether to call a particular handler module in response to a given HTTP message, or whether to simply allow the HTTP message to pass along its way without intermediation. In this regard, the reference data 82 may include (i) request trigger data 84, which specifies which, if any, handler module(s) to call in response to various HTTP request messages, and (ii) response trigger data 84, which specifies which, if any, handler module(s) to call in response to various HTTP response messages. The reference data may also include battery capacity information from the devices, power consumption data wherein type or size of file is correlated to power consumption, or algorithms for calculation power consumption or remaining battery life.

An example will be now be provided of providing power consumption notifications where the client station accesses a web page of a magazine company, which includes links to media files that represent individual articles. The example is just one possible example, and it will be clear that the techniques described in the following section can be applied to any other situation or type of media or content.

FIG. 11 depicts how a list of hyperlinks representing four articles that appear on the magazine-company's web page when displayed at client station 14. (Underlining reflects a hyperlink.) FIG. 12, in turn, depicts the markup language that might underlie that list of hyperlinks. As shown, the source code underlying each link begins with an "<A HREF>" tag that points to an HTML file of an article, and each link concludes with a closing </A>tag. Before the closing tag, each link includes display text (such as "Article #1"), which a browser will display as the respective hyperlink.

In accordance with the exemplary embodiment, the response trigger data 86 in intermediation platform 60 may be provisioned so as to include listings for each of these hyperlinks and to also include a power consumption notification for each article, based on the requesting device's battery capacity (obtained from the profile store 62), current battery level (also obtained from the profile store or from data in the HTTP GET request, and the size and file format of the articles.

Thus, by way of example, FIG. 13 displays four records that might appear in a table in the response trigger data 86.

Each record in this example recites the opening <A HREF>tag/value as the markup pattern, specifies the size of the referenced content with two numbers, the first being the number of kilobytes of a first type of file format and the second being the number of bytes of a file format of a second type; a third column that shows the type of file formats (this example assumes each file is of one or two formats), and a fourth column that lists as the associated action a function call to ADDPWRMSG(IDPWR(size)). The function ADDP-WRMSG( ) is a power consumption message handler routine. This routine, executable by the processor 68 in the platform, adds a power consumption message into the web page in conjunction with the referenced hyperlink. The IDPWR(size, type) is a parameter that is passed to the ADDPWRMSG routine that includes the size and type of the content in the articles (the data appearing under the SIZE and TYPE columns). The ADDPWRMSG routine calculates an appropriate power consumption message to insert based on the size and type of files, current battery level, battery type, user preferences, and other factors.

In operation, when the intermediation platform 60 receives an HTTP response that carries the news magazine's web page, processor 68 may reference the markup-pattern table and determine that the four hyperlinks are listed in the web page. For each hyperlink, the processor 68 may then execute the IDPWR function to compute a power consumption notification message and the ADDPWRMSG( ) function to embellish the hyperlink with the power consumption notification.

FIGS. 14 and 15 illustrate what might result from this process. In operation, when the intermediation platform 60 receives an HTTP response that carries the magazine's web page, processor 68 may reference the markup-pattern table of FIG. 13 and determine that the four hyperlinks are listed in the web page. For each hyperlink, the processor 68 may then execute functions illustrated and described above to embellish the hyperlink with the power consumption. FIG. 14 first depicts the markup language that may result. As can be seen, in each hyperlink, the ADDPWRMSG function has inserted a power consumption notification for the referenced content parenthetically just after the closing </A>tag. The first message to be included with the first article hyperlink is an "OK notification" (a reference to a standard notification that indicates that the content does not raise a power consumption problem). The second message to be included with the second article hyperlink is a "notification 1" message, a reference to a standard notification that indicates that the content raises a first level of potential power consumption problem. The third message to be included with the third article hyperlink is a "notification 2" message, a reference to a standard notification that indicates that the content raises a second level of potential power consumption problem. The fourth message to be included with the fourth article hyperlink is a "notification 3" message, a reference to a standard notification that indicates that the content raises a third level of potential power consumption problem.

FIG. 15 shows what the resulting web page may look like. In particular, after each hyperlink, the respective power consumption notifications appear parenthetically. The user is thus warned that article 1 does not pose a power consumption problem, article 2 presents a low power consumption level (i.e., the battery still has plenty of life if the article is downloaded), article 3 includes a medium power consumption level notice and notifies the user that their battery will be "low", and article 4 includes a high power consumption level notice, warning the user that the battery capacity may be below 5% if the article is downloaded.

The user can preferably configure their power consumption level profile settings (e.g., via an interactive web page managed by the wireless service provider) so that they can specify the conditions in which these notifications should be triggered. Alternatively, the provider could specify default levels which are used for all subscribers, unless they are specifically overridden with different power level settings in the user's profile. The user profiles may specify that no power consumption notices are to be provided under certain conditions, e.g., where the battery has a current capacity of at least 50 percent, where the power consumption is not expected to drop the battery below 25 percent, where the type of content is a particular size or type, or otherwise.

The example of FIGS. 11-15 uses an example of providing power consumption notices for four magazine articles. However, the notices could be provided for virtually any type of content. The principles of operation discussed above could be extended to other types of content, including executable files, interactive applications, audio content, etc.

As a further alternative, and as shown in FIG. 6B, the notifications to the client device could be provided as interstitial communications prior to actual delivery of the content. For example, the user could send a GET request for particular content (e.g., a web page) and the web page is intercepted by the intermediation platform 60. The platform may perform the calculations of power consumption based on battery level, battery type, user preferences, file size and type, etc., and then if a notice is required under the current profile (or default arrangement) the platform caches the content and sends a specific power consumption notification message to the wireless device seeking approval to transmit the content. If the approval is obtained, the platform 60 obtains the content from the cache and transmits it to the wireless device.

It will further be appreciated that the process described above will be going on in parallel for many different wireless subscriber devices. For example, one or more intermediation platform may service all the subscribers of a wireless service provider who have registered for this service, and web requests from all the devices are processed by the intermediation platform in the manner described above.

While presently preferred and alternative embodiments have been described, variation from the illustrated embodiments is possible without departure from the scope of the invention. The scope is to be determined by reference to the appended claims.

We claim:

1. In a communication system wherein web content is transmitted over a communication path from a content server to a client station operating on battery power, a method comprising:

prior to transmission of the web content within the communication path, between the content server and the client station, (i) identifying a power consumption level associated with the content in a network node remote from the client station; (ii) sending a power consumption level notification to the client station such that the notification will be presented to a user of the client station prior to presentation of the web content to the user; (iii) caching the web content; (iv) receiving an approval from the client station to transmit the web content in response to the power consumption level notification; and (v) transmitting the web content to the client station.

2. The method of claim 1, wherein the communication path extends from the content server, over a packet-switched network, and through an access channel to the client station, the method further comprising:

carrying out at least the identification of power consumption level at a node within the access channel.

3. The method of claim 1, wherein the client station comprises a wireless communication device and wherein the method further comprises the step of transmitting a current battery level message from the wireless communications device to the network node generating the power level consumption notification and responsively using the current battery level in a decision process of identifying the power consumption level.

4. The method of claim 3, wherein the notification is sent to the client station prior to transmission of the web content to the client station.

5. The method of claim 1, wherein the notification is sent to the client station together with a link to the web content.

* * * * *